United States Patent [19]

Beltrami et al.

[11] Patent Number: 5,057,662
[45] Date of Patent: Oct. 15, 1991

[54] ELECTROEROSION MACHINE FEATURING PHOTOELECTRIC SENSING MEANS FOR MEASURING WIRE ELECTRODE DEFLECTION

[76] Inventors: Ivano Beltrami, Via Mariana 1a, Muralto, Switzerland, CH-6600; Peter Wehrli, Casa Maestretti, Verscio, Switzerland, CH-6653; Axel Bertholds, Saars, Neuchâtel, Switzerland, CH-2000

[21] Appl. No.: 362,398
[22] PCT Filed: Oct. 11, 1988
[86] PCT No.: PCT/CH88/00185
  § 371 Date: May 26, 1989
  § 102(e) Date: May 26, 1989
[87] PCT Pub. No.: WO89/03270
  PCT Pub. Date: Apr. 20, 1989

[30] Foreign Application Priority Data

Oct. 13, 1987 [DE] Fed. Rep. of Germany ....... 3734677

[51] Int. Cl.$^5$ .............................................. B23H 7/02
[52] U.S. Cl. ................................................. 219/69.12
[58] Field of Search ................. 250/56.1, 578.1, 206.1, 250/215, 571; 219/69.12, 69.16, 69.17

[56] References Cited

U.S. PATENT DOCUMENTS

| 3,742,222 | 6/1973 | Endl ................................ 250/578.1 |
| 4,166,214 | 8/1979 | Fuchs-Viniczay et al. ......... 250/561 |
| 4,530,471 | 7/1985 | Inoue ............................... 219/69.12 |
| 4,707,600 | 11/1987 | Nakao et al. ...................... 250/561 |

FOREIGN PATENT DOCUMENTS

| 1580820 | 9/1969 | France . |
| 2565216 | 12/1985 | France . |
| 217225 | 12/1983 | Japan ................................ 219/69.12 |
| 61-274281 | 12/1986 | Japan ................................ 219/69.12 |
| 105003 | 5/1987 | Japan ................................ 250/561 |

Primary Examiner—Geoffrey S. Evans

[57] ABSTRACT

The invention presents a spark erosion machine, having a travelling wire electrode and an optical measuring means to measure the deflection of the travelling wire electrode. The measuring means includes a light source (10) producing a homogeneous parallel bundle of rays. A sensor assembly (1,11) measuring the light beam which comes from the light source and is shaded by the travelling wire electrode (9) is designed such as to absorb a light quantity which is dependent in one-to-one correspondence on the relative position of the travelling wire electrode (9). An evaluation circuit connected downstream of the sensor assembly provides an electrical signal indicating the deflection of the travelling wire electrode from its straight position. By means of this electrical signal, the relative positions of the guide heads of the travelling wire electrode and that of the workpiece can be corrected in such a way that machining errors caused by the deflection of the travelling wire electrode can be avoided.

26 Claims, 6 Drawing Sheets

ELECTROEROSION MACHINE FEATURING PHOTOELECTRIC SENSING MEANS FOR MEASURING WIRE ELECTRODE DEFLECTION

The invention relates to a spark erosion machine, comprising a travelling wire electrode and an optical measuring means to measure the deflection of the travelling wire electrode, the measuring means comprising a light source, a sensor assembly for measuring the light beam which comes from the light source and is shaded by the travelling wire electrode, as well as an evaluation circuit connected downstream of the sensor assembly.

Such an electric erosion machine is known from DE-PS 28 26 270. For each measuring plane, this known arrangement comprises a light source and two sensor elements disposed behind the travelling wire electrode in the direction of the light beam. These sensor elements are located laterally spaced from each other. As long as the travelling wire electrode is in a zero position, its shadow falls between the two sensor elements so that both are illuminated and provide an electrical signal. As the travelling wire electrode is deflected by a predetermined minimum value, one of the two sensor elements is shaded by the travelling wire electrode so that a conclusion may be drawn from the changing output signal of this sensor element as to the displacement of the erosive wire from its zero position. Therefore, what can be determined with this known arrangement is primarily whether or not the travelling wire electrode is in zero position. No precise measurement of the deflection is possible in a very narrow range. However, this known machine does not need a precise measurement, because a control of the position of the wire electrode is only performed with respect to the Zero-position of the sensor. Therefore, it is not possible to avoid faults in the cutting process.

A similar electric erosion machine is known from JP-OS 51-137 193. In that case the sensor arrangement consists of a group of parallel side-by-side light conducting fibers supplied with light from a light source. Again, the travelling wire electrode is positioned between the light source and the light conducting fibers. A photoelectric transducer element is connected to each light conducting fiber, and is each connected, in turn, to a summing circuit generating an output signal when at least a predetermined number of light conducting fibers is irradiated by the light source. As long as the travelling wire electrode is in a required position, its shadow conceals such a great number of light conducting elements that the summing circuit does not respond. When the travelling wire electrode is deflected out of the range of detection of this sensor arrangement all the light conducting fibers are irradiated by the light source so that the summing circuit does respond. The output signal of the summing circuit, therefore, likewise indicates only whether or not the travelling wire electrode is within its required range.

Optical measuring means which scan the contour of an object are known in other technical fields, for example, from DE-OS 19 30 111, U.S. Pat. No. 3,901,604, DE-OS 26 46 674. However, the shadow casting technique is not applied in those cases. Instead, either the deflection of a light beam is measured (U.S. Pat. No. 3,901,604) or a mark applied to the object to be measured is scanned optically (DE-OS 26 46 674, DE-OS 19 30 111), the mark having an absorbance or reflectivity which differs from the background of the object to be measured.

As regards the technical background, reference is further made to the following publications: JP-AS 58-217225, JP-OS 60-29231, JP-OS 57-178618, JP-OS 60-221221, and JP-OS 59-142021.

Cylindrical lenses having a parabolic distribution of the refractive index have been known in the market for some time. In principle, these lenses have the same optical characteristics as conventional spherical lenses, plus the additional advantage of having planar end surfaces. These lenses are used preferably for coupling light into light conducting fibers (cf. company publication entitled "Selfoc" by Messrs. TS-Optoelectronic, 8000 Munich 22). ("Selfoc" is a registered trademark by Messrs. Nippon Sheet Glass Co., Ltd.)

Although, in spark erosion work, the travelling wire electrode is clamped by driving and braking rollers between upper and lower guide heads, it still is bent or deflected by forces due to spark discharging. The higher the cutting speed in wire erosion machining, the greater the forces become that act on the travelling wire electrode, causing it to deflect. Such deflections which nowadays are in an order of magnitude of from 200 to 400 $\mu$m impair the accuracy of the cut lines. That becomes noticeable especially where curved contours are to be eroded, particularly so if a corner is to be cut as precisely as possible. The result are the well known "faulty corners". These faults at corners essentially are caused by the fact that the travelling wire electrode is deflected contrary to the direction of advance.

It has been attempted so far to reduce these faults at corners by increasing the mechanical tensile stress of the travelling wire electrode or by reducing the speed of advance during the cutting of edges, possibly with simultaneous variation of other parameters, such as the generator output. Such retardation of the advance is no longer acceptable because, on the other hand, there is a demand today for ever higher cutting speeds.

It is an essential object of the invention to improve the electric erosion machine such that faulty corners are avoided even when cutting at high speed. The invention is based on the finding that deflections of the travelling wire electrode are unavoidable. It is, therefore, another object of the invention to detect such deflections as accurately as possible and then to correct the advance data regarding the relative movement between the workpiece and the travelling wire electrode in accordance with those deflections.

In this context, it must be kept in mind that the harmful not be detected by measuring techniques. For this reason the invention provides for measuring the deflection of the travelling wire electrode in an area between a wire guide and the workpiece. A conclusion as to the maximum deflection of the travelling wire electrode occurring in the interior of the workpiece may be drawn from the deflection thus measured.

The aims or objects mentioned above are met, in accordance with the invention, in that the sensor assembly is designed such as to absorb a light quantity which is dependent in one-to-one correspondence on the relative position of the travelling wire electrode.

Advantageous modifications and further developments of the invention may be gathered from the dependent claims.

In accordance with a preferred further development of the invention an effective light absorbing surface of the sensor assembly has a strictly monotonically changing geometrical configuration. Hereby a relationship of one-to-one correspondence (in a mathematical sense) is achieved between the deflection of the travelling wire electrode and the light quantity which is absorbed.

An especially favorable form of the strictly monotonically varying geometrical configuration is the geometrical shape of a triangle with which the correlation is linear between the quantity of light absorbed and the deflection of the travelling wire electrode.

The invention can be realized in various forms. A first embodiment makes direct use of photosensitive elements of triangular shape. A second embodiment utilizes a bundle of light conducting fibers which are combined in triangular fashion in an incident plane of the light. A third embodiment of the invention provides for optical means which pass a triangular sector of the bundle of rays. Modifications of this embodiment employ a triangular diaphragm, a triangular lens, or a lens with an upstream triangular filter.

The provision of two or more measuring arrangements irradiated of the travelling wire electrode provides increased measuring sensitivity. For that purpose, an especially space-saving variant utilizes two triangles which are oppositely aligned. Where right-angled triangles are used, their hypotenuses abut each other or lie parallel to each other in the entrance planes of the sensor assembly.

In view of the fact that the measuring set-up is disposed within the effective range of the flushing liquid of the electric erosion machine where electrical phenomenons of the electrical discharge process cause electrical disturbances and where high liquid pressures prevail, of for instance 15 bars, it is particularly advantageous if there are no electrical structural members or electrical lines leading into this area. For this reason it is especially preferred to realize the guide-in and out of both the light of the light source and the measured light of the sensor assembly by means of light conducting fibers as this permits the electrical component parts to be arranged far away from the measuring range. The use of cylindrical lenses having a parabolically distributed refractive index is especially advantageous as these lenses, on the one hand, can transform light coupled-in through light conductors into a parallel homogeneous light beam and, on the other hand, can focus incident parallel rays of light in their planar exit surface, a light conductor being coupled to the same at the focus. If such a lens, acting as sensor, is ground to triangular shape such that its optical axis and its focus still are present in the remaining body, then the light quantity exiting at the focus depends linearly on the locus of the shadow of the travelling wire electrode. Also in this case, two such lenses may be placed next to each other and positioned in such manner that their optical axes will run in parallel.

In accordance with another variant use of such lenses the incident surface of the light is darkened, for instance by a diaphragm or a lacquer coat, such that only a triangular area remains transmissive. A variant embodiment including two triangular areas has two triangular filters arranged on the incident plane of the light, each filter passing or rejecting certain light wavelengths. If, in that event, a light source is used which comprises two wavelengths in tune with the filters and a beam splitter for the two wavelengths is disposed at the exit of this lens, then two partial rays are obtained whose intensity, once more, is a direct measure of the location of the shadow of the travelling wire electrode.

Further advantageous modifications and further developments of the invention may be gathered from the description of the figures below, in which:

FIG. 1 top plan view of a first embodiment of a photoelectric sensor assembly;

FIG. 2 second embodiment of the photoelectric sensor assembly;

Figure 1:
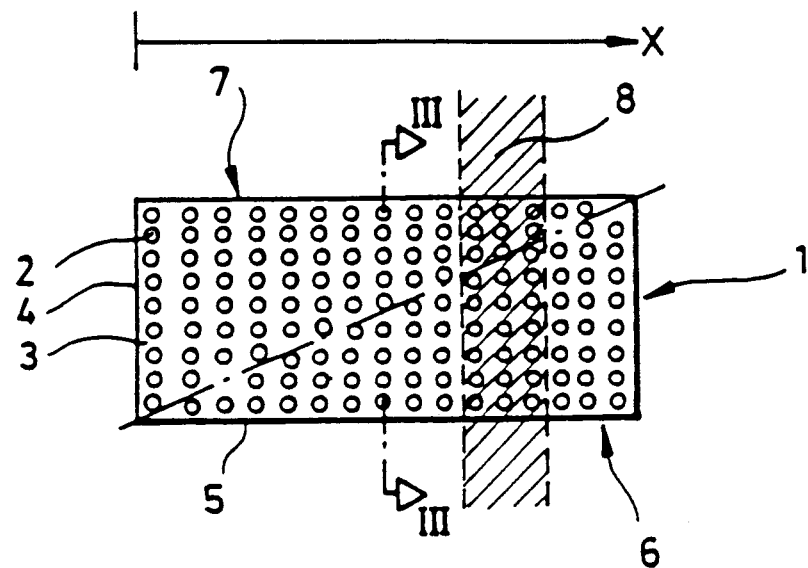

FIG. 1 shows a first embodiment of a sensor assembly 1 as used with the invention. This sensor assembly 1 comprises a plurality of light conducting fibers 2 held in mutually parallel positions by a plastics board 3. The ends of the light conducting fibers are retained firmly in the plastics board. This plastics board 3 has a broad side 4 and a long side 5. The light conducting fibers 2 are divided into a first group 6 and a second group 7 separated from each other by the diagonal of the substantially rectangular plastics board 3. A light source, not shown in FIG. 1, illuminates all light conducting fibers 2 with a parallel bundle of rays of homogeneous distribution of intensity, except for an area which is darkened by a shadow 8 of the travelling wire electrode, not illustrated in FIG. 1. This parallel bundle of rays can be produced by light conducting fibers having a small angle of aperture, the light of a light source being coupled to one end of said fibers. The number of light conducting fibers of the first and second groups 7 and 6 darkened by the shade thus depends clearly on the relative position of the shadow 8 with respect to a measuring direction x indicated in FIG. 1 by an arrow and being in parallel with the long side 5. The light conductors of both groups 7 and 6 each are combined in bundles. As the light beam has a homogeneous distribution of intensity, the sum of the light intensities of the individual light conducting fibers of the respective bundle is linearly dependent on the location of the shadow 8 with respect to the measuring direction x. In the case of group 7, this intensity decreases linearly at increasing displacement of the shadow in x-direction. In the case of group 6, on the other hand, the sum of the intensities increases linearly with the displacement of the shadow in x-direction.

In the embodiment shown in FIG. 1, the density of the light conducting fibers per unit area of the plastics board 3 is constant.

Figure 2:
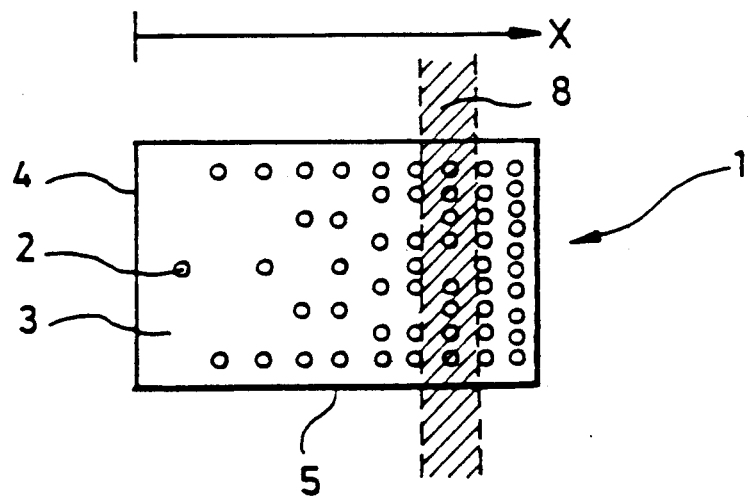

By contrast, the embodiment shown in FIG. 2 has the light conducting fibers arranged at a density which depends on the place in measuring direction x. As may be seen in FIG. 2, this embodiment includes but one group of light conducting fibers disposed at linearly increasing density in the measuring direction x. Therefore, also with the embodiment according to FIG. 2, the shadow 8 of the travelling wire electrode is cast on a number of light conducting fibers 2 which depends on the place in measuring direction x.

Figure 3:
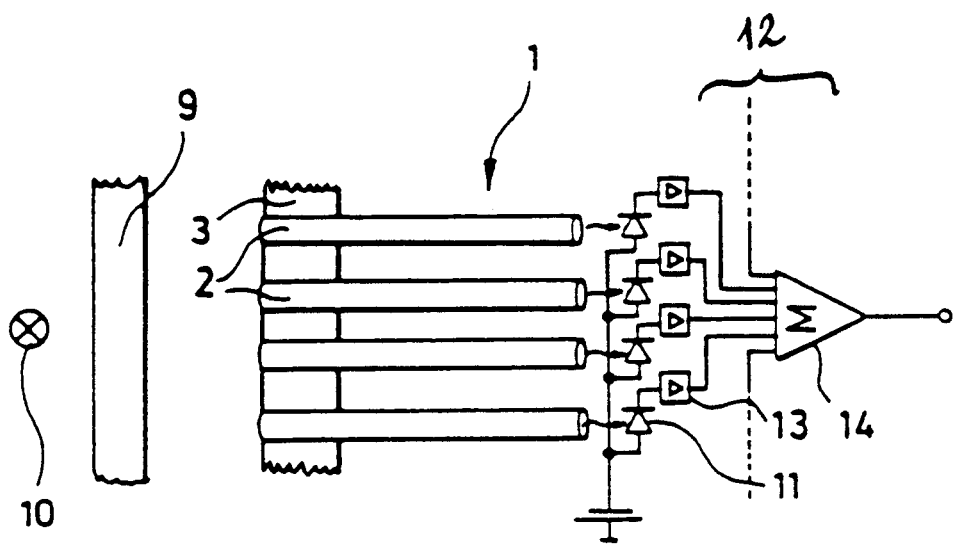
FIG. 3 is a diagrammatic presentation of the photoelectric sensor assembly including photodiodes and a downstream summing circuit.

FIG. 3 presents a sectional elevation along line III—III of the sensor assembly of FIG. 1. As shown in FIG. 3, the respective light conducting fibers 2 are framed by the plastics board 3 and held in mutually parallel relation. The travelling wire electrode 9 whose deflection is to be measured in x-direction which is perpendicular to the plane of the drawing, in the case of FIG. 3, is irradiated by a light source 10, shown diagrammatically, whereby a shadow is imaged on the sensor assembly 1. Generally, it is possible to couple all light conducting fibers to a single photodiode having an effective area which at least is as great as the effective area of the fiber bundle. This arrangement provides for an optical summation of the light of all fibers. In the case of the embodiment according to FIG. 3, each individual light conducting fiber is coupled to a photodiode 11 at its end remote from the board 3. The photodiodes are reverse biased by a voltage source. The photodiode 11 output signals representing the incidence of light on the respective light conducting fiber 2 are applied through signal amplifiers 13 to an adding circuit 14. The output signal of the adding circuit 14 thus is proportional to the number of light conducting fibers which are illuminated, i.e. not shaded by the travelling wire electrode 9. The output signal of the adding circuit depends on the locus of the travelling wire electrode in measuring direction x because, with the sensor assembly according to FIG. 1, the light conducting fibers 2 of one group 6 or 7 only are coupled to an adding circuit 14.

Figure 4:
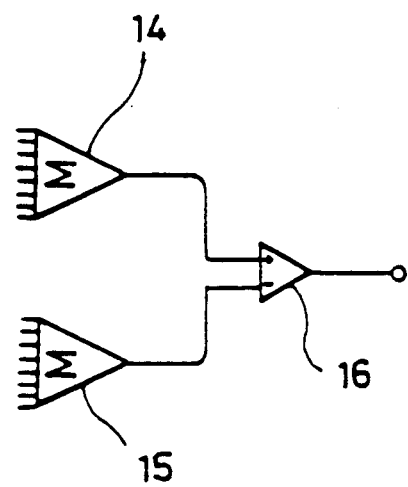
FIG. 4 is an embodiment of an evaluation circuit for the sensor assembly.

As shown diagrammatically in FIG. 4, the light conducting fibers 2 of the respective other group likewise are passed through photodiodes and signal amplifiers to another adding circuit 15 whose output signal, however, has a linearly decreasing dependence on the locus of the erosion wire 9 in the measuring direction x. These output signals of contrary sense, with reference to the location of the shadow in x-direction, are applied to a subtracting circuit 16 the output signal of which is a measure of the relative deflection of the travelling wire electrode 9 with respect to the sensor assembly 1.

In order to eliminate errors due to variations in brightness of the light source 10 as well as any other magnitudes of error influencing all signals in like manner a dividing circuit may be provided which divides the output signal of the subtracting circuit 16 by a sum signal being the sum of both adding circuits 15 and 16.

Figure 5:
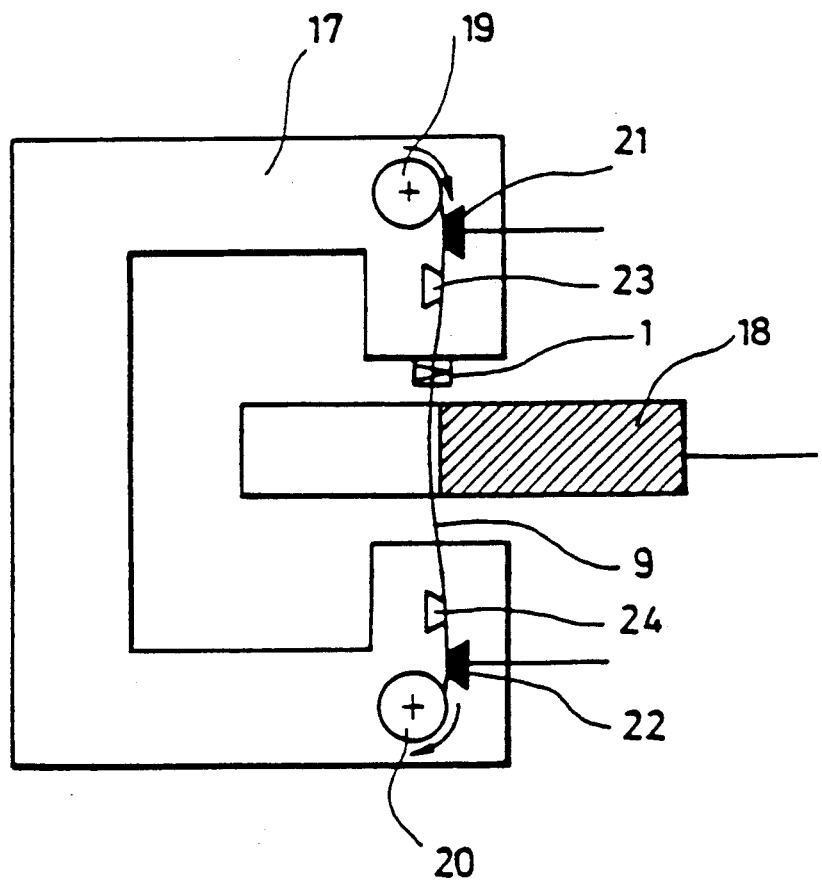
FIG. 5 is a diagrammatic presentation of an electric erosion machine comprising the photoelectric sensor assembly.

FIG. 5 is a diagrammatic presentation of a spark erosion machine 17 for erosive machining of a workpiece 18. The spark erosion machine 17 comprises a wire supply roller 19 and a wire take-up roller 20. A series of current pulses of a certain potential is fed to the travelling wire electrode by current supply members 21 and 22. The workpiece 18 is placed at the respective other potential. The position of the travelling wire electrode 9 is accurately fixed by guide members 23 and 24, respectively, located at either side of the workpiece. As clearly demonstrated in FIG. 5, however, the travelling wire electrode 9 is not clamped rectilinearly between the two guide members 23 and 24 but instead is deflected arcuately. To detect this deflection, the sensor assembly is connected to the erosion machine at the closest possible place to the workpiece 18 thereby detecting the deflection of the travelling wire electrode 9 at this location. The position of the guide members 23 and 24 is exactly known to the numerical control of the machine and for this reason the deflection of the travelling wire electrode in the measuring range of the sensor assembly 1 may be used to calculate, by extrapolation, also the maximum deflection of the travelling wire electrode 9 in the interior of the workpiece 18. And on that basis correction signals may be determined for the numerical control.

With the embodiments described above, light conducting fibers 2 together with photodiodes 11 are used as photoelectric sensor elements of the sensor assembly 1. Although this combination permits a highly compact structure of the sensor assembly in view of the small dimensions of the light conducting fibers or glass fibers, it is possible as well to make direct use of photoelectric transducer elements, without any intermission of light conducting fibers, to detect the locus of the travelling wire electrode whose place is to be determined.

With the two embodiments described above, either the density of the sensor elements varies in measuring direction, at unvarying dimension of the sensor assembly transversely of the measuring direction, or the width of the sensor assembly transversely of the measuring direction varies, at constant sensor density. Of course, these two measures, namely variation of the width of the sensor assembly transversely of the measuring direction across the length thereof and variation of the density of the sensor elements, i.e. of the number of sensor elements per unit area of the sensor assembly, also may be combined to reinforce the position detecting signal.

In the case of the embodiment described, a summation of the individual signals of the photodiodes 11 associated with the individual glass fibers 2 is effected electrically. Yet the individual glass fibers or light conducting fibers also may be combined optically, thus providing an optical total signal which is converted into an electrical output signal by a single photoelectric transducer element.

Two triangular sensor assemblies of opposed orientation are used with the embodiment shown in FIG. 1. Yet it is likewise possible to utilize a single triangular sensor. In that event, merely the measuring sensitivity of the sensor assembly is reduced.

With the embodiments of FIGS. 1 to 3 described thus far, the sensor assembly is dissolved into a plurality of sensor elements. A precise relation between the deflection of the travelling wire electrode 9 with respect to the sensor assembly 1 and the output signal of the measuring arrangement, however, may be obtained also by a design of the sensor assembly as a triangular photocell, or as a triangular optical lens, or as an optical lens including a triangular mask. Generally speaking, in that case optical means are provided in the beam path of the light ray permitting passage of a sector of the light ray to the sensor assembly, this sector of the light ray having the strictly monotonically changing geometrical configuration.

The embodiments shown in FIGS. 6 to 10 make use of cylindrical lenses having a parabolical distribution of the refractive index. These lenses will be referred to below as Selfoc lenses. (Selfoc is a registered trademark of the Nippon Sheet Glass Co., Ltd.)

Figure 6:
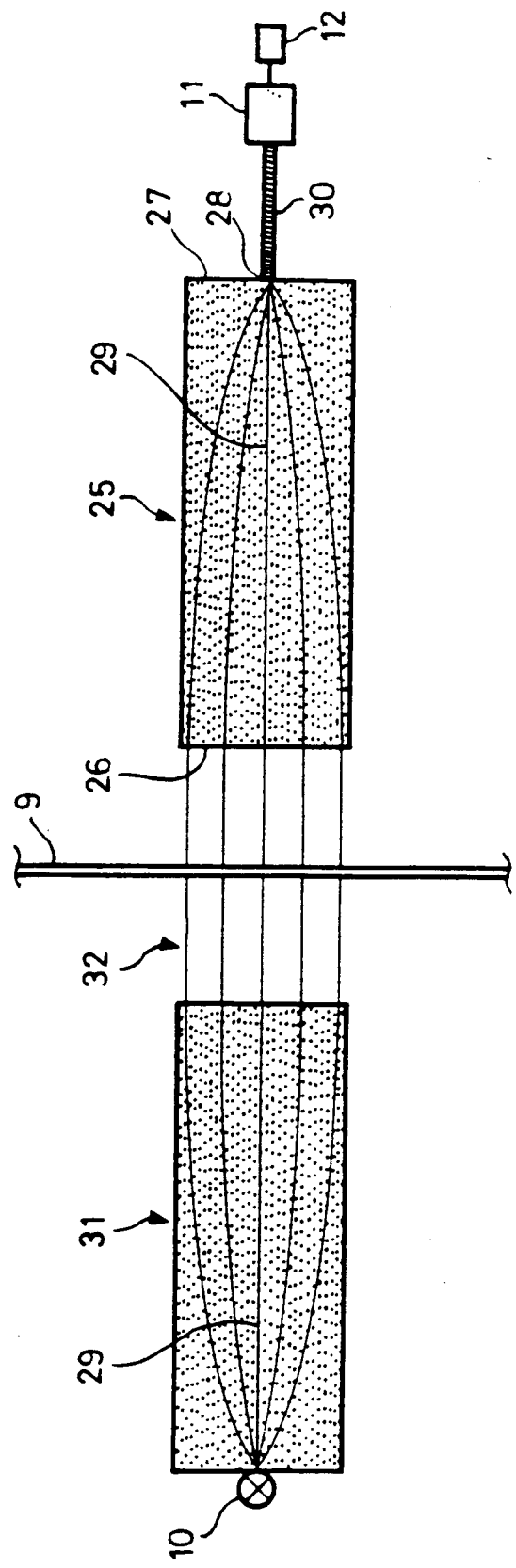
FIG. 6 is a sectional elevation of a third embodiment of the photoelectric sensor assembly.
Figure 7:
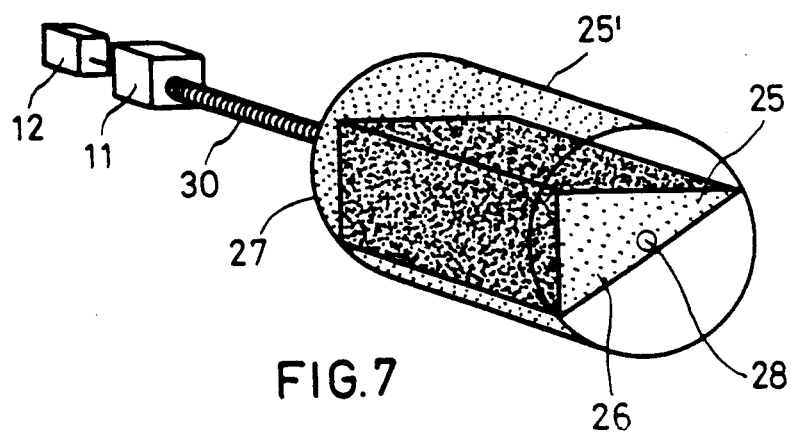
FIG. 7 is a perspective view of the sensor assembly shown in FIG. 6.

To begin with, reference is made to FIGS. 6 and 7. The light source 10 used is a punctiform light source emitting light of one wavelength only. For instance, a laser diode may be used for this purpose. This light is coupled into a first Selfoc lens 31 the pitch length of which is selected such that a parallel homogeneous bundle of rays 32 will be produced. The light source is positioned near to the focus of the Selfoc lens 31. Because of the fact that no ideal punctiform light source exists in practice, it is necessary to arrange the real light source like a lightdiode in a given distance away from the focus in order to allow the light to enter into the lens as a homogenous light. Of course, the light source also may be located at a greater distance from the Selfoc lens 31, in which case the light is conducted to the Selfoc lens 31 through a light conducting fiber. Another Selfoc lens 25 is provided in the sensor assembly, being aligned coaxially with the bundle of rays 32. The travelling wire electrode 9 lies in this bundle of rays and casts a shadow on the entrance plane 26 of the Selfoc lens 25. With the embodiment of FIGS. 6 and 7, the Selfoc lens 25 passes only a sector of the light beam, this sector having the strictly monotonically changing geometrical configuration which is the shape of a triangle in this particular embodiment. This triangular lens is ground from a cylindrical Selfoc lens, attention being paid that the optical axis 29 and thus also the focus 28 still lie within the triangular lens. As illustrated particularly clearly in FIG. 7, the cylindrical portion 25' of the Selfoc lens is removed so as to give it the triangular cross section. This triangular lens 25 continues to have the optical characteristics of a Selfoc lens, especially that of all the incident light on the entrance plane 26 being focussed in the planar exit surface 27. This means that more or less light reaches the focus 28, depending on the location of the travelling wire electrode 9, the triangular shape of the lens 25 once more establishing the linear dependence of the light intensity at the focus on the displacement of the shadow in measuring direction. In the case of the embodiment according to FIG. 6 the light from a light conducting fiber 30 is coupled out at the focus 28 of the triangular lens 25 and passed on to a photosensitive transducer element 11. In the same manner as with the embodiments according to FIGS. 1 to 5, this transducer element 11 is connected to the evaluation circuit. In this context the special advantage of the Selfoc lenses becomes manifest, too, namely that the planar exit surface 27 of the Selfoc lens permits a particularly effective coupling of a light conductor and that practically no coupling losses occur. Yet another advantage worth noting is that only a single photoelectric transducer element 11 is required.

Figure 8:
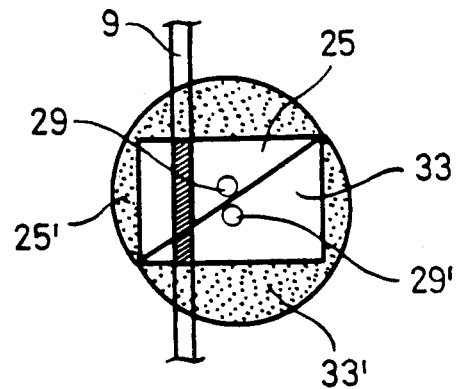
FIG. 8 is a front elevation of another variant of the embodiment shown in FIGS. 6 and 7.

Two triangles of opposite sense are used in the embodiment shown in FIG. 8, much like in FIG. 1. In other words, two Selfoc lenses 25' and 33' are ground so as to present triangular lenses 25 and 33 which then abut each other along those sides in which the optical axis 29 or 29', respectively, is located. The dotted area in FIG. 8 thus is removed by grinding. The optical axes and, therefore, the foci of the two triangular lenses 25 and 33 are located at a certain spacing from each other so that an individual light conductor can be coupled to each focus. These two light conductors are connected to a photoelectric transducer element each, and the electrical output signals of these transducer elements are applied to a subtracting circuit or a dividing circuit, in analogy with the embodiment shown in FIG. 4.

It should be stressed here that a punctiform light source with a Selfoc lens 31 according to FIG. 6 also may be used as the light source in the embodiments shown in FIGS. 1 to 3.

Figure 9:
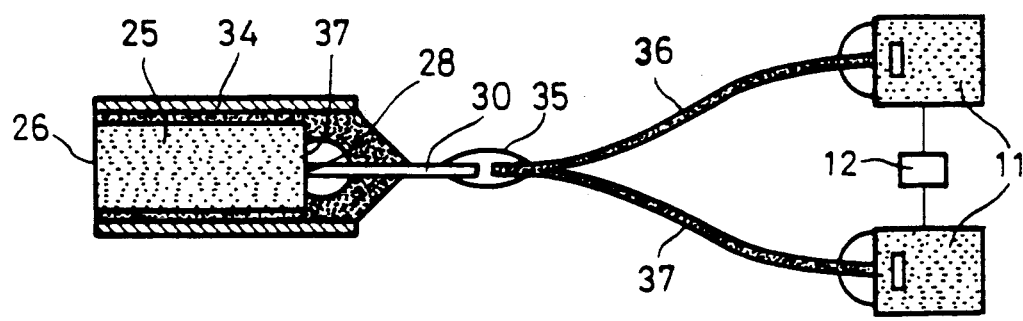
FIG. 9 is a diagrammatic side elevation of a sensor assembly according to a fourth embodiment of the invention.
Figure 10:
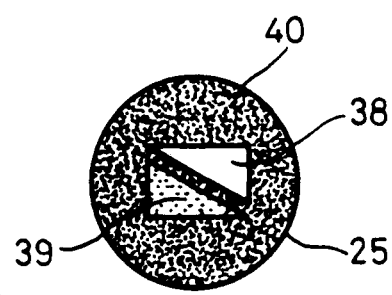
FIG. 10 is a front elevation of the embodiment shown in FIG. 9, including two wavelength filters.

The embodiment according to FIGS. 9 and 10 makes use of a cylindrical Selfoc lens 25 the entrance surface 26 of which is partly darkened by a mask which has a strictly monotonically changing geometrical configuration. In the case of a variant the entrance surface is darkened by a mask such that only a triangular area remains to pass the light of the bundle of rays. In this manner the same effect is achieved as with a lens which is ground to triangular shape. The masking applied with the embodiment of FIGS. 9 and 10 is such as to provide again two oppositely oriented triangles in order to increase or double the measuring sensitivity. For purposes of distinction of the measuring signals of the two triangles, light is used which comprises at least two different wavelengths rather than working with monochromatic light, as before. Two triangular color filters 38 and 39 adapted to the two different wavelengths are mounted on the entrance plane 26. Filter 38, for instance, passes only light of the one wavelength and filter 39 passes only light of the other wavelength. In principle, the light source also might emit white light comprising all the wavelengths of the light spectrum, provided the filters 38 and 39 are tuned to wavelengths contained in this spectrum. The remaining area 40, which is shown dotted in FIG. 10, of the entrance plane 26 again is darkened or masked and, therefore, does not permit light to enter into the cylindrical Selfoc lens 25. A single light conductor 30 is coupled to the focus 28 of the Selfoc lens 25. This light conductor conveys the two wavelengths passed by filters 38 and 39 to a beam splitter 35 of conventional structure, the two beam splitter outputs each carrying only light of the one wavelength. In the case of the embodiment of FIG. 9, the two outputs of the beam splitter 35 are coupled by two light conducting fibers 36 and 37 to two photodiodes 11 the electrical output signal of which is connected once more to the evaluation circuit 12.

With Selfoc lenses, the focus lies exactly in the exit plane for a single wavelength only, namely if the pitch length accurately equals lambda/4. Therefore, in the case of two wavelengths, chromatic aberration results, in a manner similar to conventional lenses. Now, for example, if the length of the Selfoc lens 25 is adapted precisely to the one of the two wavelengths, the focus for the other wavelength does not lie exactly in the exit plane. A certain mismatch for this other wavelength will be the consequence upon coupling to the light conducting fiber 30. Yet this mismatching can be corrected readily, for example, by adjustment of the amplification factor of an amplifier connected upstream of the two photodiodes 11 (cf. amplifier 13 in FIG. 3). This correction also can be accomplished by calculation in the evaluation circuit 12. Moreover, it is possible to give the two wavelengths of the light source different intensities or to select different attenuation factors for the two filters 38 and 39 so that the error caused by chromatic aberration is rectified at that point already. Finally, it is possible to select the pitch length of the Selfoc lens 25 such that the focus of both wavelengths will not lie in the exit plane whereby mismatching is obtained for both wavelengths, and this mismatching is exactly of the same magnitude for a suitable pitch length of the Selfoc lens.

It may likewise be seen in FIG. 9 that the Selfoc lens 25 is retained in a barrel 34, the light conducting fiber 30, too, projecting partly into said barrel and both the Selfoc lens 25 and the light conducting fiber 30 being held in the barrel by a poured compound. If desired, the light conducting fiber may be fastened additionally to the Selfoc lens by an optically neutral cement.

What is claimed is:

1. A spark erosion machine comprising a travelling wire electrode (9); an optical measuring means to measure the deflection of the travelling wire electrode, the measuring means having a light source (10); a sensor assembly (1,11) for measuring a light beam (32) from the light source (10) and shaded by the travelling wire electrode (9); and an evaluation circuit (12) which is connected electrically to the sensor assembly, characterized in that the sensor assembly (1,11) absorbs a light quantity depending in one-to-one correspondence on the relative position of the travelling wire electrode (9), and further characterized in that an effective, light absorbing surface of the sensor assembly (1) has a strictly monotonically changing geometrical configuration.

2. The spark erosion machine as claimed in claim 1, characterized in that the light absorbing surface of the sensor assembly (1) has the shape of a triangle.

3. The spark erosion machine as claimed in claim 1, characterized in that the light source (10) produces a bundle of rays (32) of parallel, homogeneous light and casts a shadow (8) of the travelling wire electrode on the effective, light absorbing surface of the sensor assembly (1).

4. The spark erosion machine as claimed in claim 1, characterized in that the sensor assembly (1) comprises a plurality of sensor elements (2, 11; 25, 33; 38, 39).

5. The spark erosion machine as claimed in claim 4, characterized in that the sensor element (2,25) output signals are summed optically to present a total signal.

6. The spark erosion machine as claimed in claim 4, characterized in that each sensor element (2,11;25,33;38,39) comprises a photoelectric transducer element (11), and in that the evaluation circuit (14–16) comprises a summing circuit (14,15) for the output signals of the photoelectric transducer elements (11) to generate a signal which indicates the relative position of the travelling wire electrode (9).

7. The spark erosion machine as claimed in claim 2, characterized in that the sensor assembly comprises a plurality of photoelectric sensor elements (2) whose dimensions are smaller than the width of the shadow (8) of the travelling wire electrode (9), and that the photoelectric sensor elements (2,11) are arranged in such manner that a number of sensor elements (2,11) depending on the locus of a section of the sensor assembly (1) in measuring direction (x) are associated with said section which is perpendicular to the measuring direction (x) and has a given length in measuring direction.

8. The spark erosion machine as claimed in claim 7, characterized in that the sensor assembly (1) comprises a substantially constant number of sensor elements (2,11) per unit area throughout its surface, and that the width of the sensor assembly (1) at right angles to the measuring direction (x) depends on the locus of the measuring direction (x).

9. The spark erosion machine as claimed in claim 7, characterized in that the number of sensor elements (2,11) per unit area depends on the locus thereof in measuring direction (x).

10. The spark erosion machine as claimed in claim 7, characterized in that the sensor assembly (1) comprises two groups (6, 7) of sensor elements (2, 11) arranged in such manner that a section perpendicular to the measuring direction (x) and having a given length in the measuring direction (x) of the first group (6) comprises a number of sensor elements having a certain dependence on the locus of the section in the measuring direction (x), and that a section perpendicular to the measuring direction (x) and having a given length in the measuring direction of the second group (7) comprises a number of sensor elements (2, 11) having an inverse dependence on the locus of the section in the measuring direction (x) compared with said certain dependence.

11. The spark erosion machine as claimed in claim 10, characterized in that each of the groups (6,7) has the configuration of a triangular field of sensor elements (2, 11), and that the triangular fields are aligned in opposite sense with respect to each other.

12. The spark erosion machine as claimed in claim 11, characterized in that the evaluation circuit (12) comprises adding circuits (14,15) and a subtracting circuit (16), that each of the adding circuits (14,15) adds up the respective output signals of the sensor elements (2,11) of one group (6,7) each, and that the subtracting circuit (16) generates an electrical signal which indicates the relative position of the travelling wire electrode (9) and presents the difference between the output signals of the adding circuits (14,15).

13. The spark erosion machine as claim in claim 7, characterized in that the sensor elements comprise light conducting fibers (2) and photoelectric transducer elements (11), that those ends of the light conducting fibers (2) which face the travelling wire electrode (9) are retained by a guide member (3) holding said light conducting fibers (2) in substantially parallel positions with respect to one another, and that the photoelectric transducer elements (11) are connected to the other ends of the light conducting fibers (2).

14. The spark erosion machine as claimed in claim 13, characterized in that the photoelectric transducer elements are photodiodes (11).

15. The spark erosion machine as claimed in claim 1, characterized in that said sensor assembly includes photoelectric transducer elements and that an optical means (2, 25, 33; 38, 39) passing a sector of the light beam (32) to the photoelectric transducer elements is provided in the beam path upstream of the photoelectric transducer elements (11), and that the sector of the light beam has the strictly monotonically changing geometrical configuration.

16. The spark erosion machine as claimed in claim 15, characterized in that the optical means is a bundle of light conducting fibers (2).

17. The spark erosion machine as claimed in claim 15, characterized in that the optical means is a triangular lens (25).

18. The spark erosion machine as claimed in claim 15, characterized in that the optical means is an optical lens (25) having a triangular mask (40).

19. The spark erosion machine as claimed in claim 15, characterized in that the optical means is a cylindrical lens (23, 25) whose refractive index varies substantially parabolically in response to the radius on the optical axis (29).

20. The spark erosion machine as claimed in claim 19, characterized in that the entrance plane (26) of the lens is occulted by a triangular mask.

21. The spark erosion machine as claimed in claim 19, characterized in that the entrance plane (26) of the cylindrical lens is occulted by at least one triangular wavelength filter and the remainder is darkened by a mask (40).

22. The spark erosion machine as claimed in claim 19, characterized in that the lens (25) has a triangular cross section.

23. The spark erosion machine as claimed in claim 22, characterized in that alight conductor (30) is coupled to the focus (28) of the lens, and that the focus lies in the planar exit surface (27) of the lens.

24. The spark erosion machine as claimed in claim 19, characterized in that the entrance plane (26) of the cylindrical lens (25) is occulted by two triangular filters (38, 39), that these filters (38, 39) pass different wavelengths of the light, that the remaining area of the entrance plane of the lens (25) is occulted by a mask (40), that the light source (10) emits light of at least the two wavelengths determined by the filters (38, 39), and that a beam splitter (35) is provided between the lens exit and the photoelectric transducer elements (11) to split the light into light of the individual wavelengths and pass the same separately to an associated transducer element (11) each.

25. The spark erosion machine as claimed in claim 24, characterized in that means are provided to correct mismatching caused by chromatic aberration to at least one of the two wavelengths.

26. The spark erosion machine as claimed in claim 25, characterized in that a punctiform light source (10) and a cylindrical lens (34) connected to the same and having a parabolically varying refractive index are provided to produce the parallel homogeneous bundle of rays (32).

* * * * *